Oct. 22, 1940.   C. I. MacNEIL ET AL   2,218,760
PROPELLER CONTROL MECHANISM
Filed Nov. 5, 1937
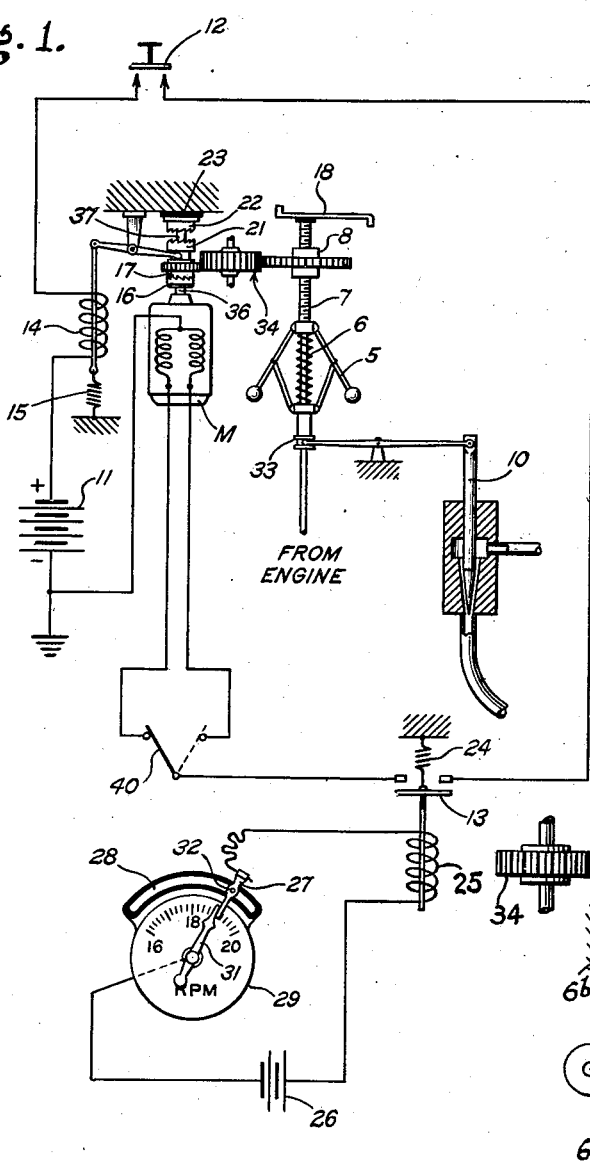
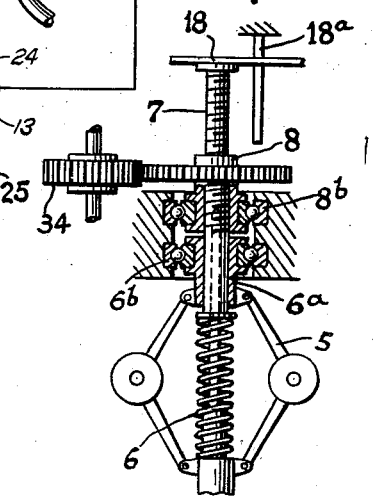
INVENTORS.
Charles I. MacNeil
Raymond T. Zwack
BY Martin J. Finnegan
ATTORNEY.

Patented Oct. 22, 1940

2,218,760

UNITED STATES PATENT OFFICE 2,218,760

PROPELLER CONTROL MECHANISM

Charles I. MacNeil and Raymond T. Zwack, ist Orange, N. J., assignors to Eclipse Aviation Corporation, East Orange, N. J., a corporation of New Jersey Application November 5, 1937, Serial No. 173,052

3 Claims. (Cl. 264—3)

This invention relates to propeller control mechanism and more particularly to a speed control mechanism.

This invention finds particular use as a control mechanism for controllable pitch propellers and especially as a means for maintaining constant speed of the propeller and its driving mechanism by variations in the pitch of the propeller.

In connection with the operation of airplanes, the desirability of having means by which the speed of the engine, especially an internal combustion engine, could be maintained constant has long been known. Among advantages to be obtained from maintaining a constant engine speed might be mentioned the improvement in "take-off" characteristic.

There are, of course, many other conditions of flight in which the constant speed control mechanism is of particular advantage.

One of the objects of the present invention is to provide a practical propeller pitch control mechanism.

In Caldwell Patent No. 1,893,612 there is disclosed (see Fig. 7) a propeller pitch control mechanism involving a hydraulic unit whose control valve is open or closed to a degree sufficient to correct for any deviation of the engine from a speed pre-selected to be the normal, the shifting of the valve being brought about by the movement of a centrifugal governor and such movement being opposed by a spring whose tension (or compression, as the case may be) is variable, by manual manipulation of an adjusting thumb screw, for the purpose of changing from one pre-selected speed to another, if and when desired.

The present invention adds to the Caldwell system the concept of automatic governor adjustment—the Caldwell thumb screw being replaced by a power screw which exerts upon the governor spring, (thus varying the hydraulic unit valve setting) a pressure proportionate to the degree of rotation of the actuating nut with which the power screw engages—this actuating nut being in turn driven by an electric motor which remains energized only so long as is necessary to establish the pre-selected speed setting of the governor, whereupon said motor is automatically de-energized. This concept of automatic governor adjustment envisages a speed control arrangement wherein the control of the hydraulic valve, above referred to, will be the sole factor governing the bringing of the engine to the desired pre-determined speed; and whereas said control will be effected through the governor modifying power screw in such manner that a definite point of travel of the power screw corresponds to a definite engine speed; wherefore by de-energizing the electric driving motor when the engine reaches the desired predetermined speed the governor modifying power screw (and hence the governor modifier itself) will be set to maintain the desired pre-determined engine speed.

Other objects and advantages of the invention will be apparent from the following description and from the accompanying drawing wherein Figure 1 is a diagrammatic representation of one embodiment of the invention, and Figure 2 is a view partly in section and partly in elevation of the centrifugal governor and certain associated parts that are shown diagrammatically in Figure 1.

In the drawing the above described governor is shown at 5, the governor spring at 6, the power screw at 7, the actuating nut at 8, the reversible electric motor at M, and the valve for governing the fluid feed to the Caldwell pitch regulating hydraulic unit at 10. The motor circuit includes battery 11 (representing any suitable current source), manual control switch 12, automatic switch 13, manual directional (field reversing) switch 40, and a solenoid winding 14 controlling release of the normally engaged clutch elements 16, 17 and simultaneous engagement of the normally disengaged clutch elements 21, 22, the latter of which is frictionally engaged by a brake element 23 permanently integrated with the housing. Other parts include a second source of current 26 and the circuit from said source to an electromagnet relay or solenoid 25, controlling the interruption of current flow to the motor M, through energization of the relay winding 25.

Switch 13 is normally held closed by spring 24 or its equivalent, and can be opened only as a result of current flow to relay winding 25, this being a part of the circuit from source 26, above described. Numeral 27 points to a key or lever slidable along an arcuate slot 28 above the speed indicator 29, said key 27 being also rotatable about pivot 32 to avoid contact with current conducting arm 31 during the process of setting the key at the desired angular position corresponding to the desired speed setting for the governor 5. After being thus set in position, key 27 is moved back into the path of movement of arm 31, so that a circuit to relay 25 may be completed automatically when arm 31 (driven from the tachometer or engine shaft) has swung far enough to strike, and hence send current through the key or lever 27. This, of course, will not occur until the change in the setting of the governor collar 33 (produced by the action of motor driven screw 7 upon governor 5) has become sufficient to shift valve 10 enough to vary the pitch of the propeller blades to the degree necessary to cause the engine speed to reach the value corresponding to the position into which key 27 has been placed—that is to say, the speed preselected to be the standard. However, even in the absence of a setting of key 27, the motor may be stopped at will by opening the manual control switch 12. Whenever the circuit from the source 11 is open either at the switch 12 or switch 13, spring 15 becomes effective to throw clutch member 21 into mesh with the braked element 22, and at the same time to disconnect the gear train 34 from the armature shaft 36 of the motor M—the purpose being to relieve the armature of any strain which might result from the sudden stoppage of the gear train when the brake 22, 23 becomes effective. In this connection it is noted that brake supporting shaft 37 is rotatably free of armature shaft 36, the latter being positively connected to the clutch element 16 only.

With switch 40 in the full line position shown, motor M will rotate in a direction to cause downward travel of member 7; in the other position the direction of rotation will be the opposite. Axial travel of the screw can be brought about only by reason of, and in response to, rotation of motor driven nut 8 in which it is threadedly received; the angle of the threads being such that axial pressure upon the screw (as by the thrust reaction of spring 6) is ineffective to independently disturb the axial setting of said screw.

It will be seen that there are two separately operable means for de-energizing motor M and operating the clutch elements 17 and 21:—first, the means 31, 27 operable at the pre-selected point if and when key 27 is so set; and, secondly, the means 12 by which the operator has manual control of the circuit, for opening and closing thereof at will.

In further explanation of the spring loading screw 7 and associated parts, it may be helpful to point out that the axial travel of the screw produces deflection of spring 6, but produces no corresponding axial movement of governor head 6a, the latter being axially fixed within bearing 6b, and the said bearing constituting part of the means for holding said governor head against axial movement, and at the same time supporting the governor mechanism as a whole. Bearings 6b and 8b—the latter being part of the supporting means for nut 8—are mounted in recesses in the supporting housing, as shown. Conversely, rotation of governor head 6a (with the governor weights) produces no effect upon screw 7, as the smooth-bored governor head runs freely on the helical surfaces of the screw, in such manner that each is movable relatively of the other.

Screw arm 18 may be provided with an aperture adapted to receive a fixed rod 18a to act as a guide and thereby positively restrain the screw against any movement angularly, while permitting unrestricted linear movement in response to rotation of nut 8.

What is claimed is:

1. In a device for use with a variable speed internal combustion engine having an engine speed controlling governor thereon, means including an electric motor for varying the governor loading, means including a source of current and a circuit for energizing said motor, said circuit including a normally closed switch, electromagnetic means for opening said switch to interrupt current flow to the motor, and means for energizing said electromagnetic means when a pre-selected engine speed is attained, said last-named energizing means including a second circuit, an engine speed indicating pointer in said second circuit, and a settable contact key in the path of movement of said speed indicating pointer, to energize the latter when engaged by said engine speed indicating pointer.

2. In a device for use with a variable speed internal combustion engine having an engine speed controlling governor thereon, means including an electric motor for varying the governor loading, means including a source of current and a circuit for energizing said motor, electromagnetic means acting upon said circuit to interrupt current flow to the motor, and means for energizing said electromagnetic means when a pre-selected engine speed is attained, said last-named energizing means including a second circuit, an engine speed responsive element in said second circuit, and means in the path of movement of said speed responsive element to energize the latter when engaged thereby.

3. In a device for use with a variable speed internal combustion engine having an engine speed controlling governor thereon, means including an electric motor for varying the governor loading, means including a source of current and a circuit for energizing said motor, means acting upon said circuit to interrupt current flow to the motor, and means for energizing said interrupting means when a pre-selected engine speed is attained, said last-named energizing means including a second circuit, an engine speed responsive element in said second circuit, and settable contact means in the path of movement of said speed responsive element to energize the latter when engaged thereby.

CHARLES I. MacNEIL.
RAYMOND T. ZWACK.